United States Patent
Ross

(10) Patent No.: US 9,313,159 B2
(45) Date of Patent: Apr. 12, 2016

(54) ROUTING MESSAGES EXCLUSIVELY TO ELIGIBLE CONSUMERS IN A DYNAMIC ROUTING NETWORK

(75) Inventor: Theodore L. Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 437 days.

(21) Appl. No.: 13/071,277

(22) Filed: Mar. 24, 2011

(65) Prior Publication Data

US 2012/0246337 A1    Sep. 27, 2012

(51) Int. Cl.

| | |
|---|---|
| G06F 15/16 | (2006.01) |
| G06F 15/173 | (2006.01) |
| H04L 12/58 | (2006.01) |
| H04L 29/08 | (2006.01) |
| H04L 12/725 | (2013.01) |
| H04L 12/721 | (2013.01) |
| H04L 12/717 | (2013.01) |
| H04L 12/18 | (2006.01) |

(52) U.S. Cl.
CPC .............. *H04L 51/14* (2013.01); *H04L 45/308* (2013.01); *H04L 45/42* (2013.01); *H04L 45/44* (2013.01); *H04L 67/327* (2013.01); *H04L 12/1859* (2013.01); *H04L 67/02* (2013.01)

(58) Field of Classification Search
CPC .... H04L 45/308; H04L 67/306; H04L 67/327
USPC ................................................. 709/238–244
See application file for complete search history.

(56) References Cited

U.S. PATENT DOCUMENTS

| | | | |
|---|---|---|---|
| 6,161,006 A | 12/2000 | Balachandran | |
| 6,704,795 B1 * | 3/2004 | Fernando | ................ H04L 45/02 709/237 |
| 7,181,441 B2 | 2/2007 | Mandato et al. | |
| 7,801,857 B2 | 9/2010 | Betts et al. | |
| 8,600,416 B2 | 12/2013 | Lin et al. | |
| 8,621,035 B2 | 12/2013 | Li et al. | |
| 9,021,131 B2 | 4/2015 | Ross | |
| 9,137,189 B2 * | 9/2015 | Ross | ..................... H04L 45/308 |

(Continued)

FOREIGN PATENT DOCUMENTS

JP    2003044407    2/2003

OTHER PUBLICATIONS

Theodore L. Ross, Systems and Methods for Secure Messgae Delivery to a Transient Recipient in a Dynamically Routed Network, U.S. Appl. No. 13/193,015, filed Jul. 28, 2011.

(Continued)

*Primary Examiner* — Jeong S Park
(74) *Attorney, Agent, or Firm* — Lowenstein Sandler LLP

(57) ABSTRACT

Embodiments relate to routing a message only along routes in a messaging network that lead to a currently active consumer for the message. The messaging network adapts to changes in the message preferences of the message consumer, and the message consumer's availability throughout the messaging network. In various embodiments, changes to message routing criteria at a destination broker in the network are propagated to all other brokers in the network until the entire network is adapted, and the network routes messages based on the adaptations, which reflect the current connectivity and message accepting criteria of each message consumer.

14 Claims, 9 Drawing Sheets

(56) References Cited

U.S. PATENT DOCUMENTS

| | | | |
|---|---|---|---|
| 2001/0003203 A1* | 6/2001 | Mache | H04L 12/581 726/12 |
| 2002/0143855 A1* | 10/2002 | Traversat | G06Q 10/10 709/202 |
| 2003/0115317 A1* | 6/2003 | Hickson | H04L 29/06 709/224 |
| 2003/0189946 A1 | 10/2003 | Yajnik et al. | |
| 2004/0003064 A1* | 1/2004 | Astley | H04L 67/306 709/223 |
| 2004/0054802 A1 | 3/2004 | Beauchamp et al. | |
| 2004/0205439 A1* | 10/2004 | Carmeli | H04L 1/1848 714/748 |
| 2004/0254993 A1 | 12/2004 | Mammas | |
| 2005/0021622 A1 | 1/2005 | Cullen | |
| 2005/0152286 A1 | 7/2005 | Betts et al. | |
| 2005/0272412 A1 | 12/2005 | Langsenkamp et al. | |
| 2006/0085507 A1* | 4/2006 | Zhao | G06Q 10/10 709/206 |
| 2006/0168037 A1 | 7/2006 | Audu et al. | |
| 2007/0014302 A1 | 1/2007 | Vincent | |
| 2007/0083669 A1 | 4/2007 | Tsirtsis et al. | |
| 2007/0237153 A1 | 10/2007 | Slaughter et al. | |
| 2007/0299947 A1 | 12/2007 | El-Damhougy | |
| 2008/0229334 A1* | 9/2008 | Graham | G06F 9/542 719/318 |
| 2009/0047948 A1 | 2/2009 | Turetsky | |
| 2009/0125231 A1 | 5/2009 | Ichimura | |
| 2009/0240586 A1 | 9/2009 | Ramer et al. | |
| 2010/0191692 A1* | 7/2010 | Gassewitz | H04L 67/22 706/47 |
| 2010/0217824 A1 | 8/2010 | Stiemerling et al. | |
| 2010/0241717 A1 | 9/2010 | Hawkings et al. | |
| 2010/0318617 A1 | 12/2010 | Rault et al. | |
| 2011/0066690 A1 | 3/2011 | Ellanti et al. | |
| 2011/0125921 A1 | 5/2011 | Karenos et al. | |
| 2011/0145263 A1 | 6/2011 | Sakamoto et al. | |
| 2011/0265164 A1 | 10/2011 | Lucovsky | |
| 2011/0269476 A1 | 11/2011 | Kumar | |
| 2011/0292804 A1 | 12/2011 | Dempo | |
| 2011/0302275 A1 | 12/2011 | Prodan et al. | |
| 2012/0072548 A1 | 3/2012 | Kim | |
| 2012/0209517 A1 | 8/2012 | Li et al. | |
| 2012/0246241 A1 | 9/2012 | Ross | |
| 2012/0246337 A1 | 9/2012 | Ross | |
| 2012/0246340 A1 | 9/2012 | Ross | |
| 2013/0031186 A1* | 1/2013 | Ross | 709/206 |
| 2013/0066936 A1 | 3/2013 | Krishnan et al. | |

OTHER PUBLICATIONS

Theodore L. Ross, "Systems and Methods for Providing Distributed Dynamic Routing Using a Logical Broker", U.S. Appl. No. 13/071,243, filed Mar. 24, 2011.
Theodore L. Ross, "Systems and Methods for Identifying Linked Message Brokers in Dynamic Routing Network", U.S. Appl. No. 13/071,306, filed Mar. 24, 2011.
AMPQ 1.0 Draft Recommendation, http:www.ampq.org/confluence/pages/viewpage.action?pageId=4489238, May 19, 2010, 94 pages.
USPTO, Office Action for U.S. Appl. No. 13/193,015 mailed Jun. 19, 2013.
Non-Final Office Action for U.S. Appl. No. 13/193,015 mailed Dec. 30, 2013.
Final Office Action for U.S. Appl. No. 13/193,015 mailed Oct. 24, 2014.
USPTO, Office Action for U.S. Appl. No. 13/071,243 mailed Sep. 3, 2014.
USPTO, Office Action for U.S. Appl. No. 13/071,243 mailed Jul. 21, 2014.
USPTO, Office Action for U.S. Appl. No. 13/071,243 mailed May 12, 2014.
USPTO, Office Action for U.S. Appl. No. 13/071,243 mailed Dec. 6, 2013.
USPTO, Office Action for U.S. Appl. No. 13/071,243 mailed Oct. 17, 2013.
USPTO, Office Action for U.S. Appl. No. 13/071,243 mailed Jul. 22, 2013.
USPTO, Office Action for U.S. Appl. No. 13/071,243 mailed Mar. 22, 2013.
USPTO, Notice of Allowance for U.S. Appl. No. 13/071,306 mailed Sep. 24, 2014.
USPTO, Office Action for U.S. Appl. No. 13/071,306 mailed Oct. 21, 2013.
USPTO, Office Action for U.S. Appl. No. 13/071,306 mailed Feb. 28, 2013.
USPTO, Office Action for U.S. Appl. No. 13/071,306 mailed May 21, 2014.
USPTO, Notice of Allowance for U.S. Appl. No. 13/071,243 mailed May 5, 2015.
USPTO, Notice of Allowance for U.S. Appl. No. 13/071,306 mailed Dec. 31, 2014.
USPTO, Final Office Action for U.S. Appl. No. 13/193,015 mailed May 18, 2015.
USPTO, Advisory Action for U.S. Appl. No. 13/193,015 mailed Jul. 24, 2015.

* cited by examiner

ROUTING MESSAGES EXCLUSIVELY TO ELIGIBLE CONSUMERS IN A DYNAMIC ROUTING NETWORK

FIELD

The present invention relates to message routing generally, and more particularly relates to routing a message exclusively along paths in a network that lead to a consumer of the message.

BACKGROUND

In conventional messaging systems, the communication routes between brokers are statically defined at system setup, often based on the connections of message consumers who exist at the time that the network is first configured. Such systems typically follow a publish and subscribe model of message distribution, forwarding all messages from message producers to all brokers in the network because a consumer for any particular message may potentially be connected to any broker in the network. Such conventional systems have no knowledge or tracking of whether or not a consumer for a particular message exists along any particular route through the network.

As a consequence, conventional systems constantly forward messages to brokers that have no consumers connected to them, either directly or indirectly. This results in inefficient and unnecessary use of system resources, such as communication bandwidth between brokers, as well as processing and storage resources on each individual broker that unnecessarily handles a message for which there is no downstream consumer. This also results in increased and unnecessary security risks, as messages traverse communications links between brokers, and are stored at least briefly on brokers, in portions of the network that do not lead to message consumers.

Accordingly, it is desirable to provide systems and methods that dynamically route messages only to brokers and portions of the messaging network that lead to currently connected consumer(s) of the messages.

DESCRIPTION OF DRAWINGS

The accompanying drawings, which are incorporated in and constitute a part of this specification, illustrate several embodiments of the invention and together with the description, serve to explain the principles of the invention.

DESCRIPTION OF EMBODIMENTS

Figure 1:
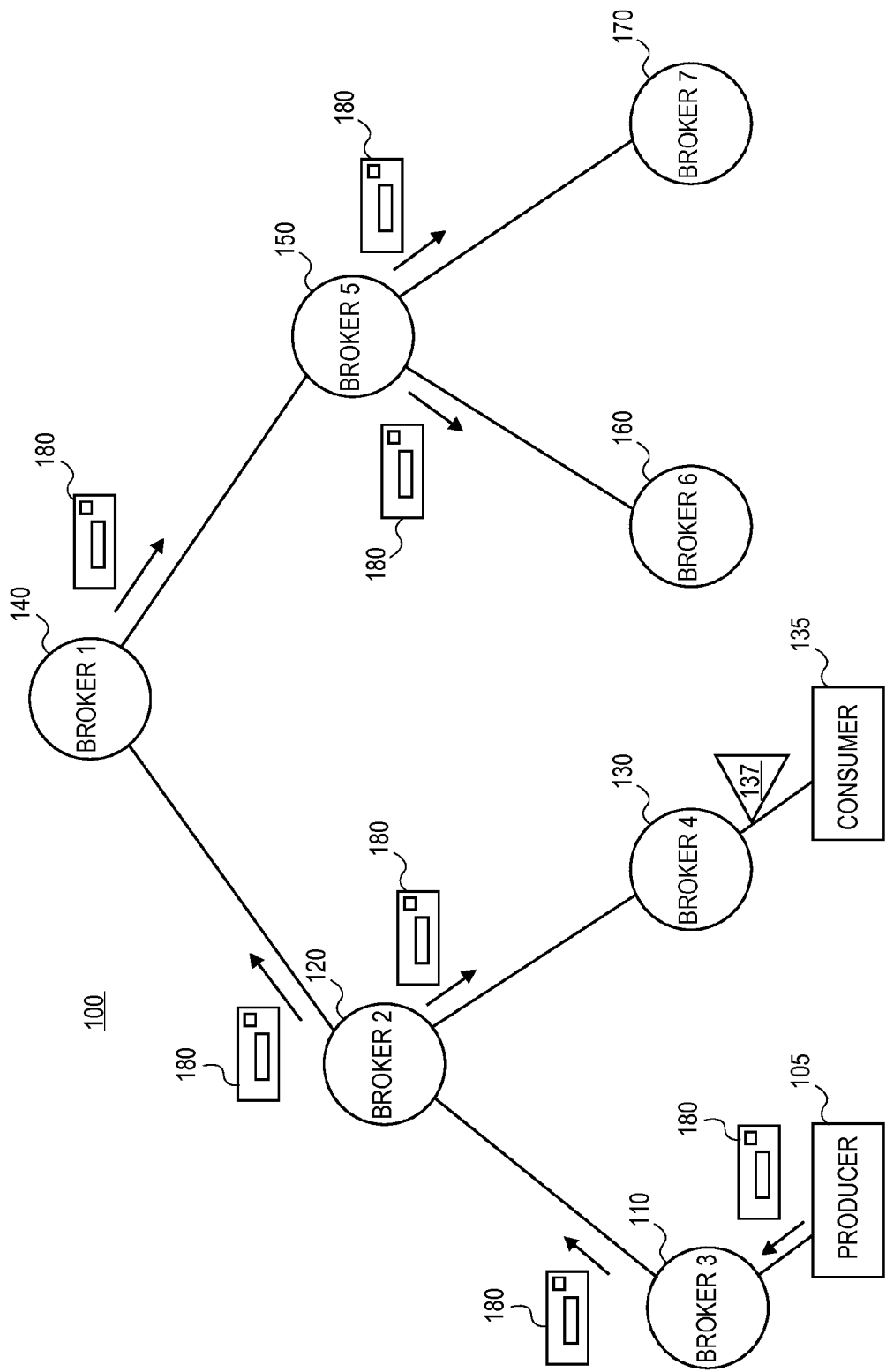
FIG. 1 is a diagram showing a network of brokers illustrating prior art message processing.

Reference will now be made in detail to embodiments of the invention, examples of which are illustrated in the accompanying drawings. Wherever convenient, the same reference numbers will be used throughout the drawings to refer to the same or like parts.

Embodiments consistent with the present teachings relate to systems and methods for dynamic messaging routing that include a network of brokers that dynamically keep track of whether and where message consumers are connected to the network, including keeping track of when a connection status changes (e.g., when a consumer connects to, or disconnects from, the network, and the consumer's message acceptance criteria), and route each message only along network paths that lead to a consumer of that message. In various embodiments, consumers supply message routing criteria to the local broker to which they are connected (or conversely, disconnect from the network, which causes the removal of message routing criteria for the disconnected consumer).

Brokers in the network coordinate with each other to apply the routing criteria of a destination broker to a source broker, so that any message that would match one of these routing criteria is routed to the destination broker. If routing criteria are added to or removed from the destination broker, these changes are propagated to all connected brokers throughout the network. When a destination broker removes a criteria that allows a specified type of message to pass, the connected brokers follow suit and no longer incur the overhead or security risks of transferring messages that match that criteria.

According to various embodiments, systems, methods, and computer-readable media are provided for routing messages in a messaging network. The embodiments perform operations including maintaining routing information for each of a plurality of message consumers connected to the messaging network, receiving a message, comparing an attribute of the message to the routing information for each of the plurality message consumer connected to the messaging network, determining, based on the result of the comparison, (e.g., a match), whether there is a broker that is connected to a message consumer of the plurality of messages consumers that can receive the message, and routing the message to the broker that was determined only if the broker is connected to the message consumer that can receive the message.

Further embodiments provide additional functionality, including functionality for determining, (based on the results of the comparison between the attribute of the message and the routing information), whether there is a message consumer of the plurality of message consumers that is directly connected to the computing system that can receive the message, and routing, by the computing system, the message to the message consumer that was determined only if the message consumer can receive the message.

Still other embodiments are implemented such that the attribute of the message comprises metadata associated with the message. In other embodiments, the metadata associated with the message comprises a topic assigned to the message by a producer of the message. In various embodiments, the message includes content, and the attribute of the message comprises information in the content of the message, or the message includes content; and the routing information comprises information that must match corresponding information in the content of the message, wherein the information that must match is specified by the message consumer. In some embodiments, the operation of maintaining routing information for each message consumer comprises updating the routing information for a message consumer of the plurality of message consumers that changes a connection status with the messaging network.

Referring now to the drawings, FIG. 1 is a diagram showing a network of brokers 100 demonstrating prior art message processing. As shown, network 100 is formed of interconnected brokers, including broker 1 140, which is connected to broker 2 120 and broker 5 150. Broker 2 140 is connected to broker 3 110 and broker 4 130. Broker 5 150 is connected to broker 6 160 and broker 7 170.

As shown, a producer 105 of messages is connected to broker 3 110. In various networks, producer 105 may be a data processing system, such as a laptop or desktop computer, operated by a user, which sends messages. In other networks, producer 110 may be an application or software program running on a data processing system, which sends messages. There is also a consumer 135 connected to network 100 via broker 4 130. Consumer 135 may be a data processing system, such as a laptop or desk top computer, operated by a user, which may receive messages from producer 105. Alternatively, consumer 135 may be an application or software program running on a data processing system, which receives messages from producer 105.

Consumer 135 may use a message-matching criteria 137, (such as a binding key in an advanced message queuing protocol (AMQP) implementation) to subscribe to messages published to messaging network 100. The message-matching criteria 137 informs broker 4 130 which messages to provide to consumer 135, such as messages that include a routing key (in an AMQP implementation) that matches message-matching criteria 137. Thus, in conventional messaging systems such as system 100, only the local broker that a message consumer is directly connected to (in this case, broker 4 130) knows the message acceptance criteria provided by the message consumer. The other brokers in the network are not provided with this information.

FIG. 1 represents a typical publish and subscribe messaging system implemented on network 100. In a publish and subscribe system, senders of messages (e.g., producer 105) do not specify that messages are to be sent directly to any specific receiver(s) (e.g consumer 135). Instead, published messages are distributed without knowledge by the producer 105 of what, if any, subscribers, such as consumer 135, there may be. In many cases, a publisher may attach a label to each message that characterizes the message as belonging to a specific class or topic. Subscribers may express interest in one or more topic, for example by specifying the topic using message-matching criteria 137, and subscribers only receive messages that are of interest, without knowledge of what, if any, publishers or producers there are.

In the example shown in FIG. 1, producer 105 sends a message 180 into network 100 via broker 3 110. Because brokers, like producers, do not know what, if any, consumers of message 180 are connected to network 100, brokers simply distribute messages to all other brokers in the network, in case any of them may have an appropriate consumer connected to it. To implement the distribution, broker 3 110 sends message 180 to all the brokers (and any subscribed consumers) connected to it—in this case, to broker 2 120. Broker 2 120, in turn, then distributes message 180 to all brokers connected to it—in this case, broker 4 130 and broker 1 140. Broker 1 140 sends message 180 to broker 5 150, which in turn distributes copies of message 180 to broker 6 160 and broker 7 170.

As each broker receives message 180, it checks whether or not there is a consumer connected to it that has subscribed to receive message 180. If a broker has no consumer for message 180, such as broker 6 160 or broker 7 170 in FIG. 1, then the broker discards message 180. If, on the other hand, a broker does have a consumer that has subscribed to receive message 180, then the broker provides message 180 to the consumer. In the example of FIG. 1, broker 4 130 is connected to consumer 135, which has subscribed to receive a copy of message 180 by specifying criteria in message-matching criteria 137 that cause broker 4 130 to route message 180 to consumer 135.

As illustrated by the example of FIG. 1, a conventional messaging system does not restrict the distribution of messages. A message is distributed to every broker node in network 100 in order to make sure that the message gets to every broker node where a consumer may be attached. This system uses the destination broker nodes to delete unconsumed messages after the message gets to the node.

There are, however, several drawbacks to this conventional system for distributing messages. First, this system wastes bandwidth unnecessarily. As shown in FIG. 1, distributing copies of message 180 from broker 2 120 among broker 1 140, broker 5 150, broker6 160, and broker 7 170 unnecessarily uses the bandwidth between these brokers, as well as the computing and storage resources of the brokers themselves, because there are no consumers for message 180 connected to that portion of network 100. Another drawback is related to security. Creating and passing unneeded copies of message 180 to broker 1 140, broker 5 150, broker 6 160, and broker 7 170 increases the risk that message 180 will be intercepted or otherwise compromised in transit between brokers or while temporarily stored on a broker before being forwarded to another broker or deleted.

Figure 2A:
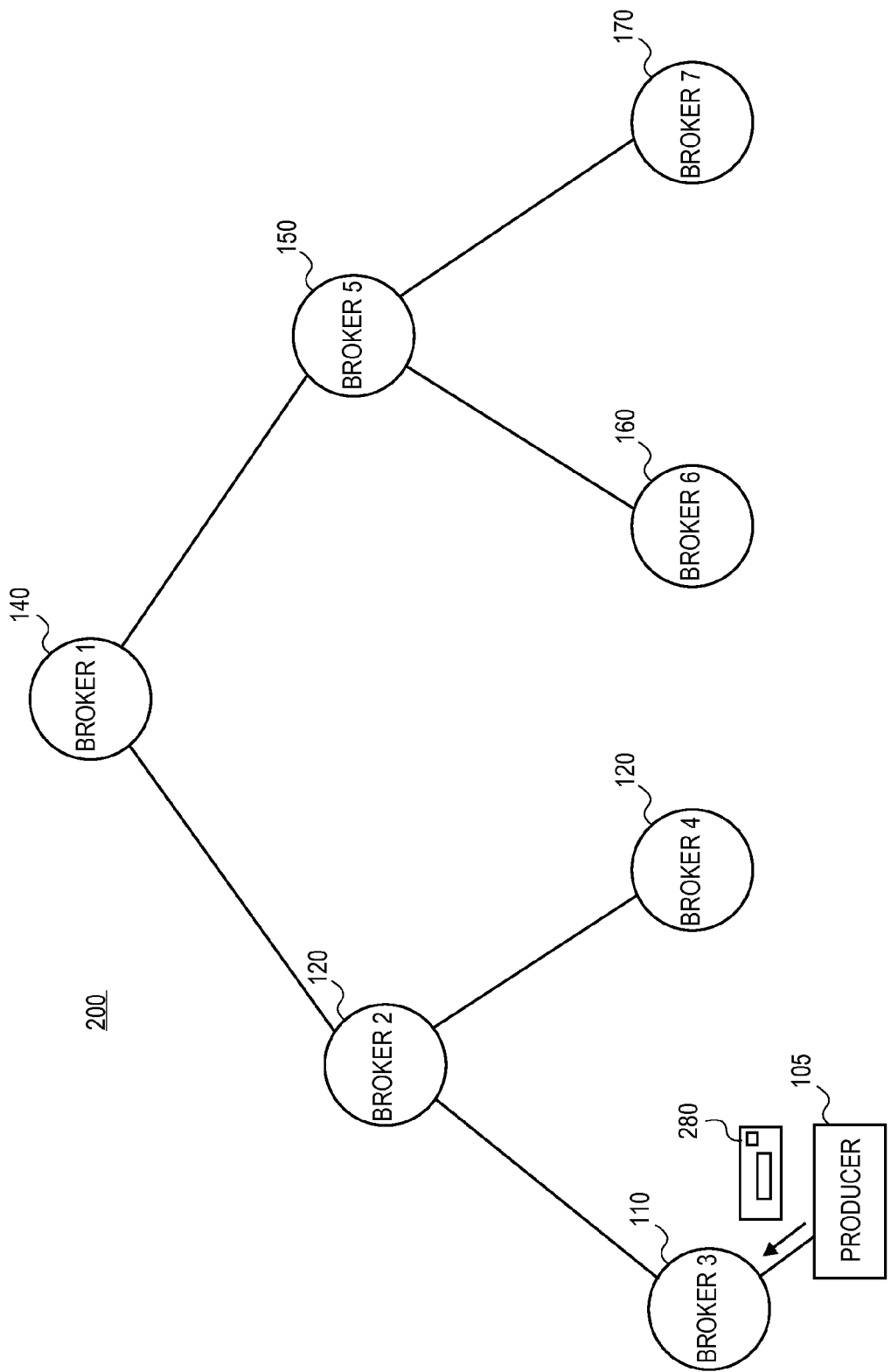
FIGS. 2a-2c are diagrams showing a network of message brokers illustrating an exemplary messaging system consistent with embodiments of the invention.
Figure 2B:
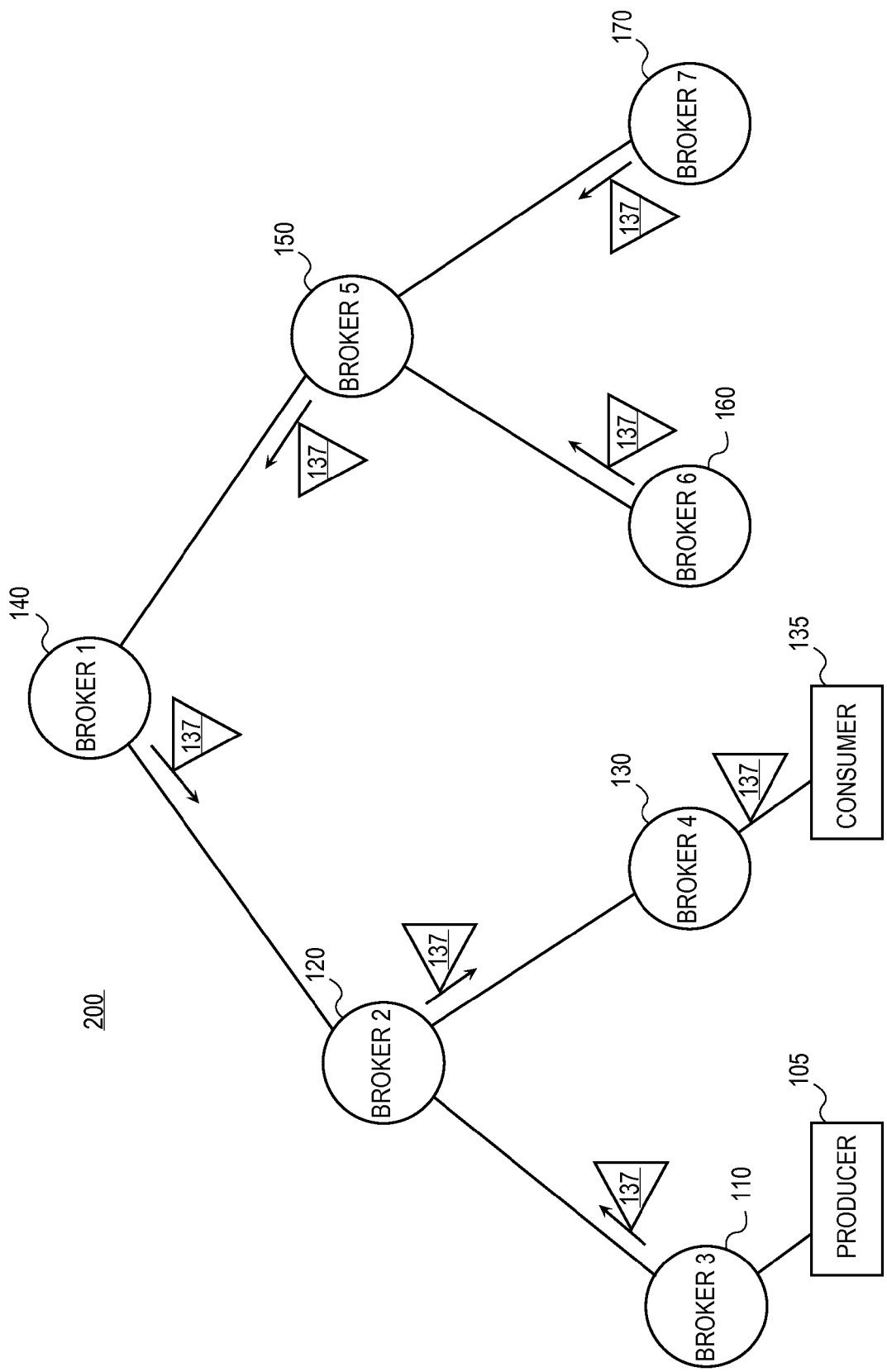
Figure 2C:
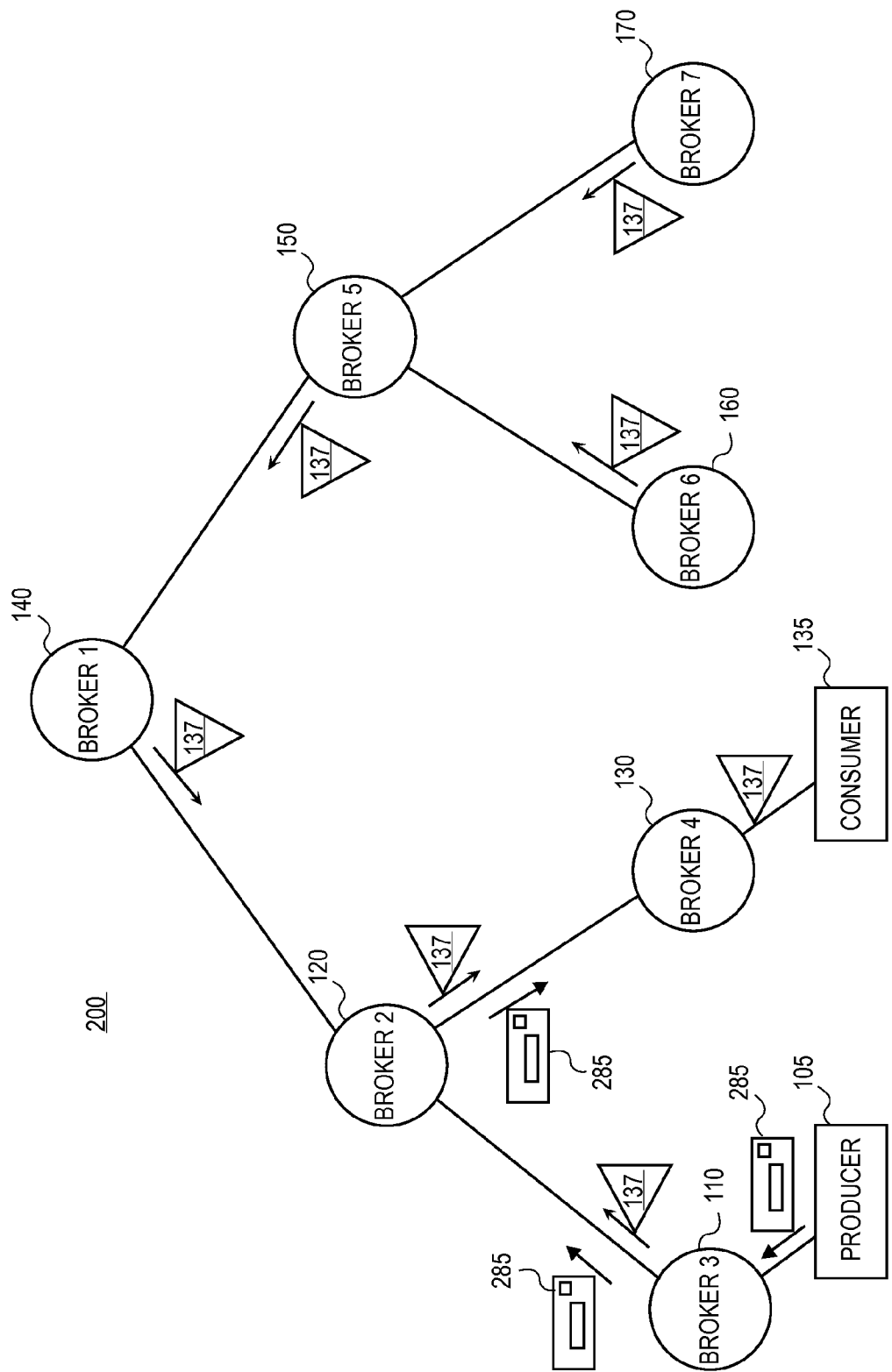

FIGS. 2a-2c are diagrams showing a network 200 of message brokers illustrating an exemplary messaging system consistent with embodiments of the invention, which does not suffer the aforementioned drawbacks. In the embodiment shown in FIGS. 2a-2c, the brokers of network 200 are configured to implement a publish/subscribe messaging system that dynamically routes a given message only along paths that lead to a consumer(s) of that message. U.S. patent application Ser. No. 13/071,306 entitled "Identifying Linked Message Brokers in a Dynamic Routing Network," by Theodore L. Ross filed on Mar. 24, 2011, issued as U.S. Pat. No. 9,021,131 on Apr. 28, 2015which is hereby incorporated by reference in its entirety, describes in detail embodiments of brokers that are configured to route a given message only along paths that lead to a consumer(s) of that message.

As shown in FIG. 2a, and similar to FIG. 1, network 200 is formed of interconnected brokers, including broker 1 140, which is connected to broker 2 120 and broker 5 150. Broker 2 140 is connected to broker 3 110 and broker 4 130. Broker 5 150 is connected to broker 6 160 and broker 7 170.

As shown, a producer 105 of messages is connected to broker 3 110. In various networks, producer 105 may be a data processing system, such a laptop or desk top computer, operated by a user, which sends messages. In other networks, producer 110 may be an application or software program running on a data processing system, which sends messages. In the scenario depicted in FIG. 2a, producer 105 publishes a message 280 to broker 3 110 for distribution throughout network 200 when there are no consumers (i.e., subscribers) of message 280 currently connected to network 200. As mentioned previously, in a publish and subscribe system, message senders (e.g., producer 105) do not specify who the receiver(s) of a message should be. Instead, a message sender publishes messages without any knowledge of who the subscribers are on the network and without knowledge of whether there any subscribers at all on the network.

As shown in the scenario depicted in FIG. 2a, and unlike conventional network 100, when producer 105 publishes message 280 to broker 3 110, broker 3 110 does not transmit a copy of message 280 to any other brokers in network 200 because none of the other brokers in network 200 is connected to a consumer that subscribes to message 280. In one embodiment according to this scenario, broker 3 110 discards message 280 undelivered to any consumer.

Referring now to FIG. 2b, the same network 200 is shown. In the scenario shown in FIG. 2b, a message consumer 135 has connected to broker 4 130. Consumer 135 may be a data processing system, such as a laptop or desktop computer, operated by a user, which may receive appropriate messages from producer 105. Alternatively, consumer 135 may be an application or software program running on a data processing system, which may receive appropriate messages from producer 105. Consumer 135 provides message-matching criteria 137 to broker 130. Message-matching criteria 137 specifies attributes or characteristics of messages that consumer 135 will receive. In other words, message-matching criteria 137 defines the messages consumer 135 wants to receive and will consume (i.e., the messages that consumer 135 is subscribing to).

In this scenario, when consumer 135 provides message-matching criteria 137 to broker 4 130, broker 4 130 propagates message-matching criteria 137 to the broker it is connected to, broker 2 120. Broker 2, in turn, propagates message-matching criteria 137 to the brokers that it is connected to, namely broker 3 110 and broker 1 140. Broker 1 140 then propagates message-matching criteria 137 to the broker that it is connected to, namely broker 5 150. This process continues until all the brokers in network 200 receive message-matching criteria 137.

As message-matching criteria 137 propagates through network 200, the brokers in network 200 configure themselves (e.g., by modifying their routing information) to forward messages that they receive and that correspond to message-matching criteria 137 toward consumer 135. This is represented in FIG. 2b by the arrows near each broker accompanied by the triangle representing message-matching criteria 137. As noted above, the process of propagating message-matching criteria throughout the network and configuring the brokers to route messages only along network paths that lead to appropriate consumers is described in detail in the U.S. patent application Ser. No. 13/071,306 entitled "Identifying Linked Message Brokers in a Dynamic Routing Network," by Theodore L Ross filed on Mar. 24, 2011, issued as U.S. Pat. No. 9,021,131 on Apr. 28, 2015, which is incorporated herein by reference.

FIG. 2c illustrates a scenario where a message 285 that matches message-matching criteria 137 enters network 200. As shown, producer 105 publishes message 285 to broker 3 110. Broker 3 110 determines whether message 285 matches message-matching criteria 137, which it received as explained with respect to FIG. 2b. Upon determining that message 285 matches message-matching criteria 137, broker 3 110 forwards message 285 to broker 2 120. Broker 2 120, in turn, determines whether message 285 matches message-matching criteria 137. Upon determining that message 285 matches message-matching criteria 137, broker 3 110 forwards message 285 to broker 4 130. Note that broker 2 120 does not forward a copy of message 285 to broker 1 140 because broker 2 120 has not received any message-matching criteria from broker 1 140 indicating that there is a consumer or subscriber for message 285 connected to broker 1's portion of network 200.

When broker 4 130 receives message 285, it determines whether message 285 matches message-matching criteria 137 associated with consumer 135. Upon determining that message 285 corresponds to message-matching criteria 137, broker 4 130 provides message 285 to consumer 135. As exemplified by the scenario of FIG. 2c, network 200 routes a message exclusively to broker nodes that lead to a currently connected consumer of the message at the time that the message is passing through the broker node.

In some embodiments, messaging network 200 may be implemented as a direct matching system, wherein metadata associated with message 285, and/or data in the contents of message 285, must exactly match the message-matching criteria 137 in order to be routed to consumer 135. Metadata may include information in, for example, a routing key(s) attached to a message or information in a header or in a property field that provides an "envelope" for the contents of a message. In various embodiments, message-matching criteria 137 may specify the value or information that must be matched in order to route a message, and specify where to find the relevant value or information—e.g., in a particular header, in a particular property field, in a specific portion of the message contents, etc. In other words, message-matching criteria 137 informs a broker where to look (e.g., routing key, message header, message contents, etc.) to find the information needed to route the message, as well as what to look for (e.g., what the value of field must be to match).

In some embodiments, the publisher of a message (e.g., producer 105) can insert particular attributes into the metadata or contents of a given message (e.g., message 285) to ensure that only a specific intended recipient (or recipients) receives the message, and to ensure that the message is not distributed to portions of the messaging network that are not connected, either directly or indirectly, to the intended recipient. For example, producer 105 may insert a unique identification number into the metadata of message 285, wherein the unique identification number is known only to consumer 135, and wherein consumer 135 uses the unique identification number in message-matching criteria 137. In this example, as shown in FIG. 2c, message 285 will be routed only from broker 3 110 to broker 2 120 to broker 4 130 to consumer 135 because only consumer 135 has configured message-matching criteria 137 with the unique identification number. Similarly, if a producer (not shown) connected to message broker 5 150 and published a message (not shown) having the same unique identification number from this example in its metadata, then that message would be routed from broker 5 150 to broker 1 140 to broker 2 120 to broker 4 130 to consumer 135, without being routed to any other broker nodes in network 200.

One of ordinary skill will recognize that the topology, producer connections, consumer connections, and other details of messaging network 200 are exemplary and presented in the form shown for conciseness and ease of illustration. Other components, topologies, connections, etc. may be substituted for those shown without departing from the scope of the invention. In addition, one of ordinary skill will recognize that for implementations with two-way communications, consumer 135 may also be a producer/publisher of messages bound for producer 105, and producer 105 may also be a consumer of messages published by consumer 135. In addition, one of ordinary skill will recognize that messaging networks consistent with the principles of the invention may be implemented by adding functionality to or modifying known message-oriented middleware systems, such as advanced message queuing protocol (AMQP) systems, RestMS systems, Java Messaging Service (JMS), Microsoft Message Queue (MSMQ), and Size-Prefixed Blob (SPB) systems, and the like.

Figure 3A:
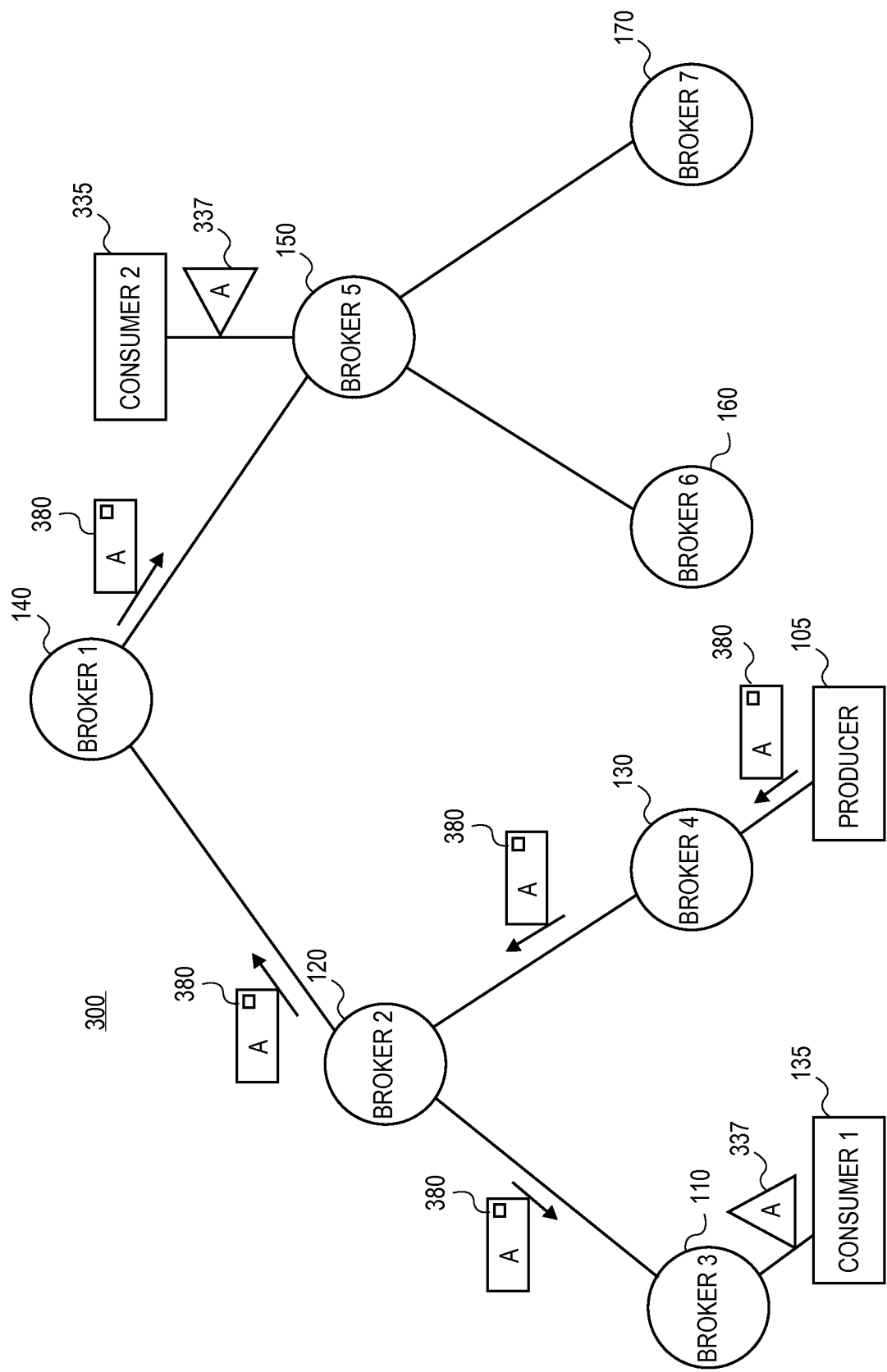
FIGS. 3a-3c are diagrams showing a network of message brokers illustrating an exemplary messaging system consistent with embodiments of the invention.
Figure 3B:
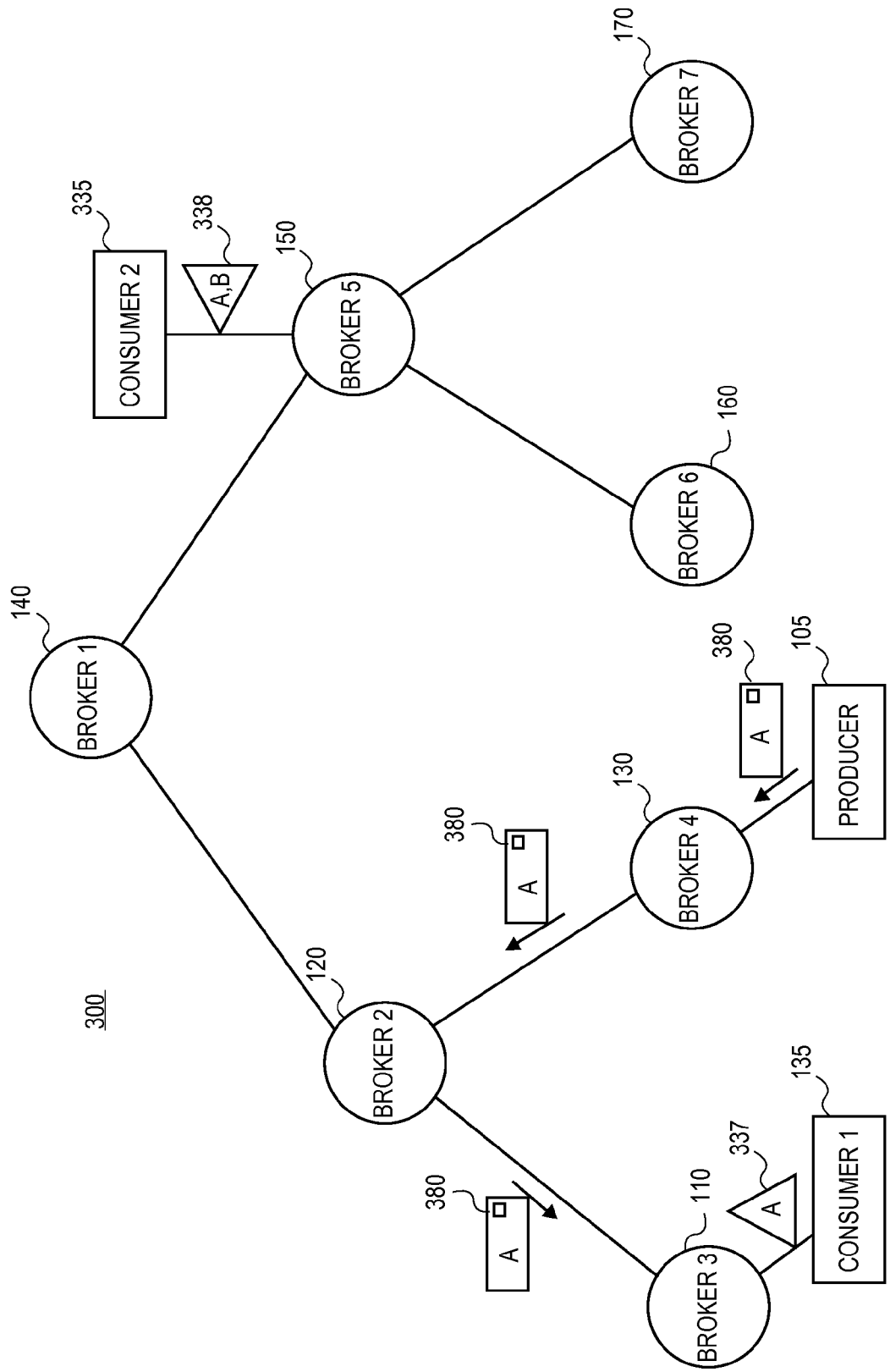
Figure 3C:
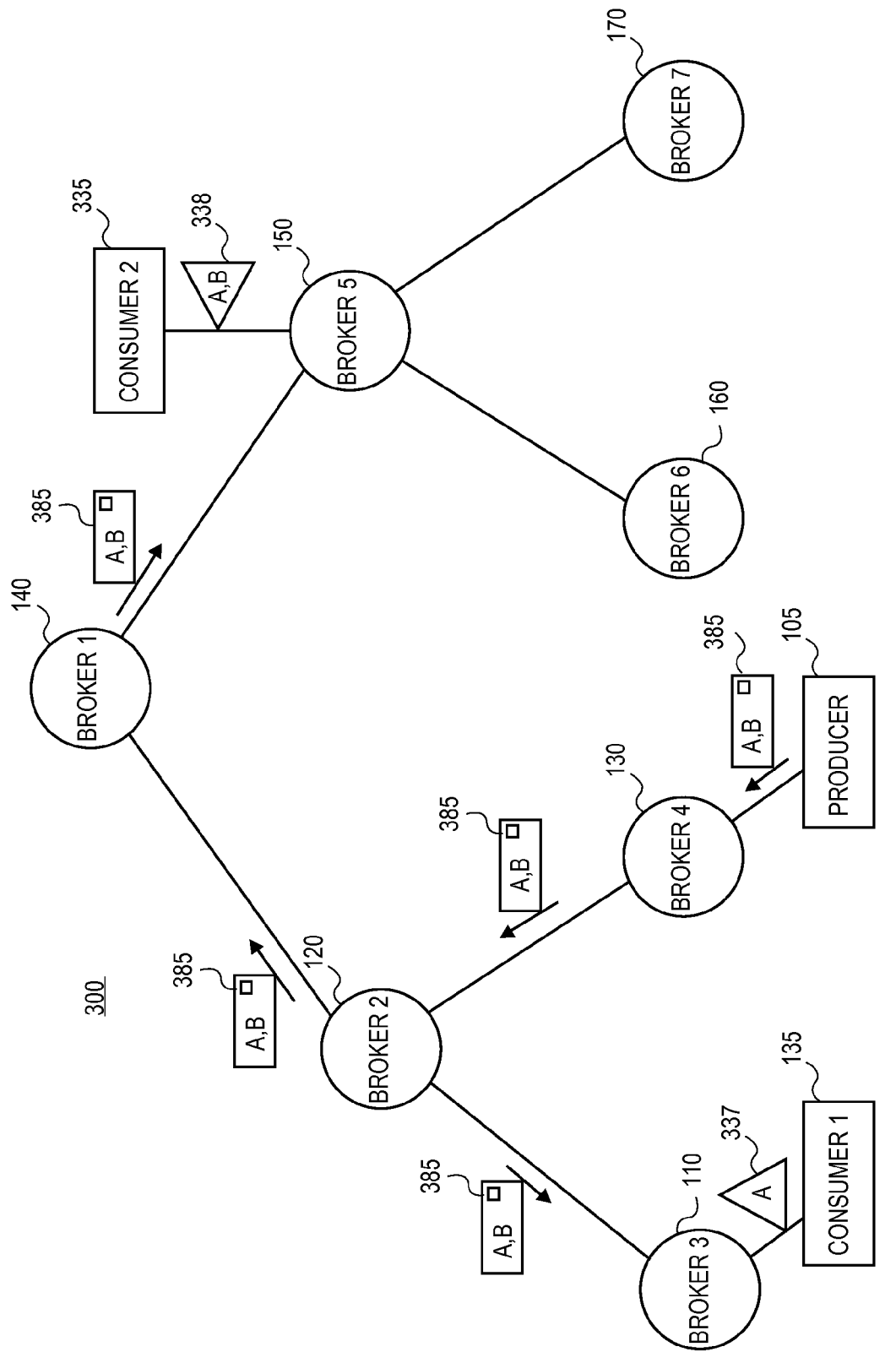

FIGS. 3a-3c are diagrams showing a network 300 of message brokers illustrating an exemplary messaging system consistent with embodiments of the invention. In the embodiment shown in FIGS. 3a-3c, the brokers of network 300 are configured to implement a publish/subscribe messaging system that routes a given message only along paths that lead to a consumer(s) of that message. In the example shown, network 300 consists of message brokers as described with respect to the message brokers of network 200 of FIGS. 2*a*-2*c*.

Referring now to FIG. 3*a*, network 300 includes a consumer 1 135 connected to broker 3 110 and a consumer 2 335 connected to broker 5 150. Consumer 1 135 has used message-matching criteria 337 to subscribe to messages published to network 300, and consumer 2 335 has used message-matching criteria 338 to subscribe to messages published to network 300. In this example, message-matching criteria 337 includes subscription information that is used to identify a message, (for example, a binding key in an AMQP-based implementation), which is represented by the letter "A" in the triangle. Message-matching criteria 338 is similar.

In some embodiments, messaging network 300 may implement a topic-based system, wherein a message producer publishes each messages with "topic" metadata, which may, for example, be a field or attribute in the message "envelope" (e.g., a message header) that identifies a topic or category, (such as "weather") that describes the message. The publisher is responsible for defining the topics, and subscribers can subscribe to any topic provided by the publisher. Subscribers in a topic-based system will receive all messages published to the topic(s) to which they subscribe, and all subscribers to a topic will receive the same messages. For example, in an AMQP-based implementation, a message publisher (e.g., producer 105) may insert a topic word or words, such as "weather" into a standard header in an AMQP-based message that is called a routing key. Brokers in an AMQP network use the routing key header to match messages to queues, which provide messages to other brokers and subscribers (e.g. consumer 1 135). Each queue specifies a binding key (e.g., message-matching criteria 337) and if the binding key matches the value of the routing key header of a message, then the associated queue receives the message, which is then available to the broker or subscriber assigned to the queue.

In an embodiment as shown in FIG. 3*a*, where network 300 is implemented as a topic-based messaging network, consumer 1 135 and consumer 2 335 have subscribed to topic "A" as represented by message-matching criteria 337 and message-matching criteria 338. As previously explained with respect to FIG. 2*b*, when consumer 1 135 and consumer 2 335 subscribed to topic "A," the corresponding message-matching criteria 337 and message-matching criteria 338 were propagated to each broker in network 300, and each broker was configured to forward any messages matching topic "A" only along paths in network 300 that lead to consumer 1 135 and consumer 2 335, and not along paths that do not lead to an appropriate consumer.

In the scenario shown in FIG. 3*a*, producer 105 publishes to broker 4 130 a message 380 with the topic attribute "A." Broker 4 130 forwards message 380 to broker 2 120. Broker 2 120 routes copies of message 380 in two directions—one copy of message 380 is provided to broker 3 110 and another copy of message 380 is provided to broker 1 140. Upon receiving message 380, broker 3 110 checks the topic attribute, and finds that the topic is "A." Broker 3 110 then checks whether any consumers connected to it have subscribed to topic "A." Because message-matching criteria 337 for consumer 1 135 indicates topic "A" is of interest to consumer 1 135, there is a match, and broker 3 110 provides message 380 to consumer 1 135.

The other copy of message 380 sent by broker 2 120 is received by broker 1 140. Broker 1 140 routes message 380 to broker 5 150 based on its routing configuration, which was instigated when message-matching criteria 338 was provided to broker 1 140 by broker 5 150 at the time of subscription by consumer 2 335.

Upon receiving message 380, broker 5 150 checks the topic attribute of message 380, and finds that the topic is "A." Broker 5 150 then checks whether any consumers connected to it have subscribed to topic "A." Because message-matching criteria 338 for consumer 2 335 indicates topic "A" is of interest to consumer 2 335, broker 5 150 provides message 380 to consumer 2 335.

Broker 5 150 also checks its routing information to determine whether to forward a copy of message 380 to broker 6 160 and/or broker 7 170. Because there are no consumers that have subscribed to topic "A" connected to either of broker 6 160 or broker 7 170, the routing information of broker 5 150 does not indicate that message 380 should be routed to either of broker 6 160 or broker 7 170.

Although FIG. 3*a* has been described using the example of network 300 being implemented as a topic-based messaging system, one of ordinary skill will recognize that network 300 may be implemented as a content-based messaging system without departing from the principles of the invention. In various embodiments of a content-based messaging system, messages are only delivered to a subscriber if something in the content of those messages matches a criteria or constraint(s) defined by the subscriber. In a content-based messaging system the subscriber is responsible for classifying the messages that the subscriber wishes to receive. One of ordinary skill will further recognize that network 300 may also be implemented as some hybrid combination of a topic-based messaging system and a content-based messaging system, without departing from the principles of the invention.

Turning now to the scenario illustrated in FIG. 3*b*, in the illustrated embodiment, network 300 is implemented as a hybrid topic-based and content-based messaging network. In this embodiment, publishers (e.g., message producer 105) post messages to a topic, while subscribers (e.g., consumer 1 135 and consumer 2 335) register content-based subscriptions to one or more topics. In the exemplary scenario shown, consumer 1 135 has subscribed to topic "A" as represented by message-matching criteria 337. Consumer 2 335 has subscribed to topic "A" and further specified that he wishes to receive only messages containing content "B," as represented by message-matching criteria 338. As previously explained with respect to FIG. 2*b*, when consumer 1 135 and consumer 2 335 subscribe with message-matching criteria 337 and message-matching criteria 338, respectively, then message-matching criteria 337 and message-matching criteria 338 are propagated to each broker in network 300, and each broker is configured to forward any messages corresponding to the message-matching criteria only along paths in network 300 that lead to an appropriate consumer. In the exemplary embodiment shown in FIG. 3*b*, the brokers of messaging network 300 will forward messages having a topic that matches "A" along paths that lead to consumer 1 135. Similarly, the brokers of messaging network 300 will forward messages having a topic that matches "A" and having content that matches "B" along paths that lead to consumer 2 335.

In the exemplary scenario illustrated in FIG. 3*b*, producer 105 publishes message 380, which is classified with topic "A," to network 300 via broker 4 130. In this scenario, the content of message 380 does not contain information or an attribute (e.g., a specific word or number) that matches "B." Upon receiving message 380, broker 4 130 forwards message 380 to broker 2 120, as its routing information tells it that broker 2 120 is connected, either directly or indirectly (in this case), to a consumer that has subscribed to topic "A." Upon receiving message 380, broker 2 120 examines the topic of message 380 and routes message 380 to broker 3 110, as its routing information tells it that broker 3 110 is connected, either directly (in this case) or indirectly, to a consumer that has subscribed to topic "A." Upon receiving message 380, broker 3 110 examines the topic of message 380 and routes message 380 to consumer 1 135, as its routing information tells it that consumer 1 135 has subscribed to topic "A," as indicated in message-matching criteria 337.

When broker 2 120 receives message 380 from broker 4, 130, broker 2 120 also examines the contents of message 380 to determine whether the content matches "B." Because message 380 does not contain content that matches "B," broker 2 120 does not forward message 380 to broker 1 140, as its routing information indicates that only messages under topic "A" and having content "B" are to be sent to broker 1 140.

Although FIG. 3b has been described using the example of network 300 being implemented as a hybrid messaging system that combines characteristics of a topic-based system and content-based messaging system, one of ordinary skill will recognize that network 300 may be implemented as a content-based messaging system without departing from the principles of the invention, wherein consumer 1 135 specifies a single content attribute "A" in message-matching criteria 337, and consumer 2 335 specifies two content attributes "A" and "B" in message-matching criteria 338. One of ordinary skill will further recognize that network 300 may also be implemented as a topic-based messaging system without departing from the principles of the invention, wherein consumer 1 135 specifies a single topic "A" in message-matching criteria 337, and consumer 2 335 specifies two topics "A" and "B" in message-matching criteria 338, and wherein message producer 105 may produce messages classified with two or more topics.

FIG. 3c illustrates the same network configuration as FIG. 3b, but in the illustrated scenario, producer 105 publishes a message 385 under topic "A" and containing attribute "B" in the message content. As shown, broker 4 130 received message 385 from producer 105 and forwards message 385 to broker 2 120, as the routing information of broker 4 130 tells it that broker 2 120 is connected, either directly or indirectly (in this case), to a consumer that has subscribed to topic "A" and to a consumer that has subscribed to topic "A" in conjunction with content "B."

Upon receiving message 385, broker 2 120 examines the topic of message 385 and routes message 385 to broker 3 110, as its routing information tells it that broker 3 110 is connected, either directly (in this case) or indirectly, to a consumer that has subscribed to topic "A." Upon receiving message 385, broker 3 110 examines the topic of message 385 and routes message 385 to consumer 1 135, as its routing information tells it that consumer 1 135 has subscribed to topic "A," as indicated in message-matching criteria 337.

When broker 2 120 receives message 385 from broker 4 130, broker 2 120 also examines, (in addition to the topic), the contents of message 385 to determine whether the content matches "B." In the scenario of FIG. 3c, message 385 contains content that matches "B," and thus broker 2 120 forwards a copy of message 385 to broker 1 140, according to its routing information, which indicates that there is consumer for messages published under topic "A" and having content "B" connected to broker 1 140, either directly or indirectly (in this case).

Upon receiving message 385, broker 1 140 looks at the topic of message 385 and the contents of message 385 and determines whether the topic and content match any message routing criteria in its message routing information. In this scenario, the routing information of broker 1 140 indicates that broker 5 150 is connected, either directly or indirectly to a consumer that has subscribed to messages published under topic "A" and having content "B." Accordingly, broker 1 140 sends message 385 to broker 5 150.

Upon receiving message 385, broker 5 150 performs a similar process of examining the message topic and content, and determines that message 385 should be provided to consumer 2 335 because message-matching criteria 338 set up by consumer 2 335 indicates a subscription to messages under topic "A" and having content "B."

An example illustrating a simple use of this capability is the case where producer 105 publishes messages under the topic "weather," where the content of each message describes the weather forecast in various geographic regions covered by message producer 105, such as Boston, New York, Philadelphia, and Washington, D.C. In this example, consumer 2 335 may be located in Boston and connected locally to a server implementing broker 5 150, which is also located in Boston. Because he is located in Boston, consumer 2 335 may be interested only in weather messages related to Boston and may not wish to receive weather messages related to New York, Philadelphia, or Washington, D.C. To realize these restrictions, consumer 2 335 may subscribe to messages with topic "weather" and further specify that he only wishes to receive messages published to the weather topic that also contain the word "Boston" in the message contents.

For example, in an AMQP-based implementation, consumer 2 335 may connect to local broker 5 150 and create for itself a queue on broker 5 150 to receive messages. Consumer 2 335 supplies a key to bind their queue to an AMQP-based topic exchange implemented by broker 5 150, where the binding key may specify a topic, such as topic="weather*" and a metadata match, such as content="Boston." Note that without further specifying limiting conditions (i.e., the word "Boston" appearing in the message contents), all messages published under the weather topic would be forwarded to consumer 2 335, including unwanted weather messages related to New York, Philadelphia, or Washington, D.C.

Also note that in addition to providing message 385 to consumer 2 335, broker 5 150 determines that it should not forward message 385 to either of broker 6 160 or broker 7 170, because the routing information does not indicate that either of broker 6 160 or broker 7 170 has an appropriate consumer connected to it. Thus, no resources are wasted sending messages that will not be consumed to broker 6 160 and broker 7 170.

One of ordinary skill will recognize that the topology, producer connections, consumer connections, and other details of messaging network 300 are exemplary and presented in the form shown for conciseness and ease of illustration. Other components, topologies, connections, etc. may be substituted for those shown without departing from the scope of the invention. In addition, one of ordinary skill will recognize that two-way communications may be implemented between message producers and message consumers without departing from the scope of the invention. In addition, one of ordinary skill will recognize that the implementation examples mentioned in the context of an improved AMQP-based messaging network may just as readily be implemented in the context of improvements to other types of message-oriented middleware systems, such as, for example, RestMS systems, Java Messaging Service (JMS), Microsoft Message Queue (MSMQ), Size-Prefixed Blob (SPB) systems, and the like.

Figure 4:
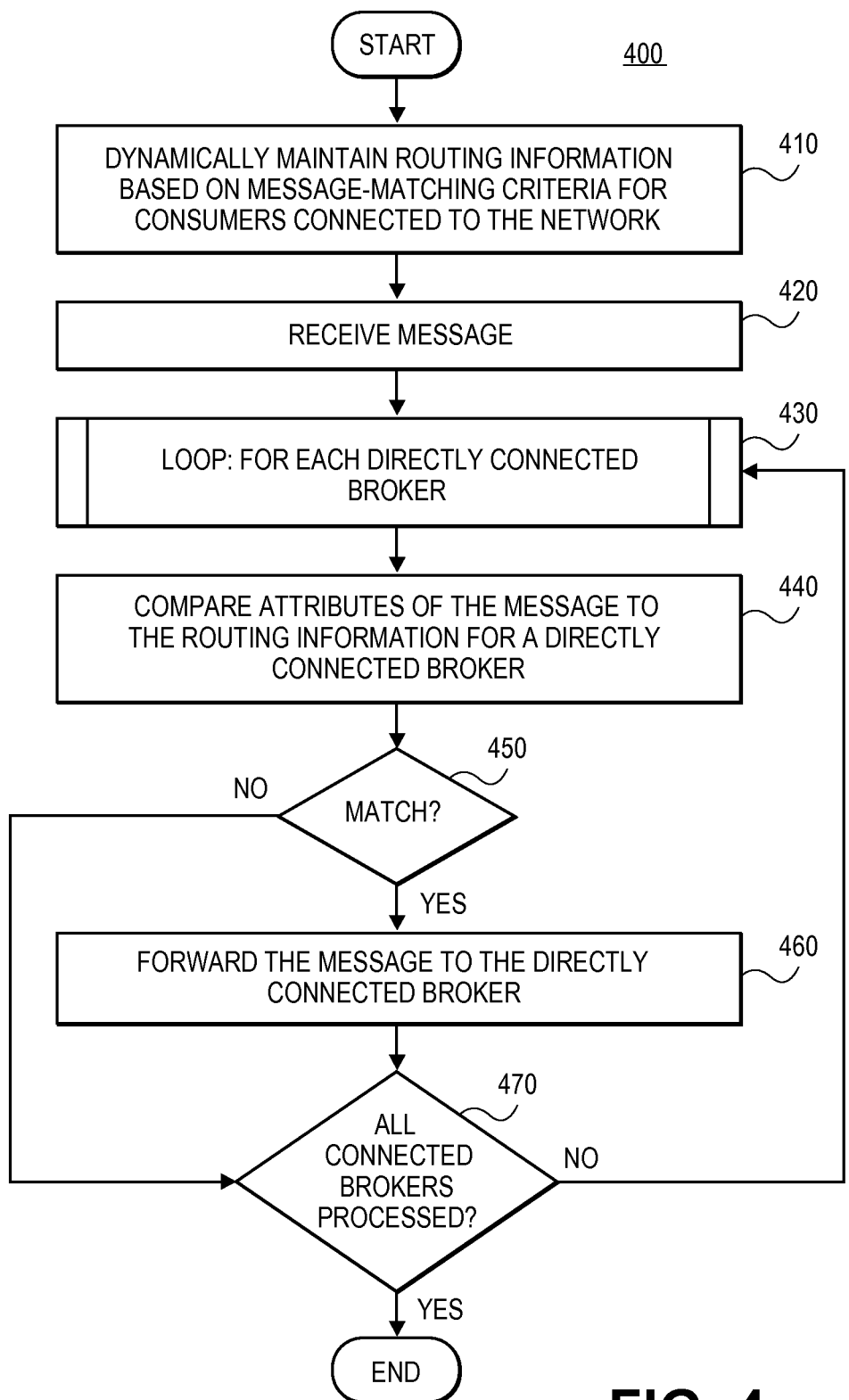
FIG. 4 is a flowchart showing an exemplary process for routing messages from one broker to another, consistent with embodiments of the invention.

FIG. 4 is a flowchart showing an exemplary process 400 for routing messages from one broker to another, consistent with embodiments of the invention. In various embodiments, process 400 may be implemented by a server computer, or other data processing system, functioning as a message broker, such as brokers 110, 120, 130, 140, 150, 160, and 170 of FIGS. 2 and 3. In the embodiment shown in FIG. 4, process 400 begins by dynamically maintaining routing information based on message-matching criteria for message consumers connected to a messaging network (stage 410). In various embodiments, dynamically maintaining the routing information may include storing 1) information representing the location and/or direction where each message consumer is connected to the network (e.g., the broker to which a consumer is connected), and 2) information representing messages the consumer would like to receive (e.g., the message-matching criteria, message subscription information, etc. provided by the consumer). Dynamically maintaining the routing information may also include updating the stored information whenever a message consumer changes its status (e.g., when a consumer connects or disconnects from the messaging network, when a consumer adds, deletes, or revises message-matching data, etc.). In various embodiments, the routing information for a broker indicates which directly connected brokers are themselves connected, either directly or indirectly via one or more hops, to a consumer that has registered or subscribed to receive messages having specific properties, characteristics, or attributes, such as specific topics and/or specific associated metadata information. Exemplary details related to stage 410 are described in the U.S. patent application Ser. No. 13/071,306 entitled "Identifying Linked Message Brokers in a Dynamic Routing Network," by Theodore L Ross filed on Mar. 24, 2011, which is incorporated herein by reference in its entirety, and in U.S. patent application Ser. No. 13/071,243entitled "Providing Distributed Dynamic Routing Using a Logical Broker," by Theodore L Ross filed on Mar. 24, 2011, which is hereby incorporated by reference in its entirety, which describes in detail embodiments of dynamically routed messaging systems and messaging networks that provide a single logical broker for a message consumer, regardless of where the consumer connects to the system or network.

Process 400 continues by receiving a message (stage 420). The message may be received, for example, from a message producer (e.g., message producer 105) or from another broker.

At stage 430, a loop begins wherein the entity implementing process 400, such as a message broker, seeks to route the message to a broker or brokers that are directly connected to it, but only if the directly connected broker is itself currently connected, either directly or indirectly, to a consumer for the message. To this end, at stage 440, process 400 compares the attributes of the received message to the routing information for the directly connected broker that is currently being considered in the loop.

If the attributes of the message do not match the routing information for the directly connected broker that is currently being considered in the loop (stage 450, No), then process 400 proceeds to stage 470 and determines whether all the directly connected brokers have been processed, and if not (stage 470, No), then the loop continues by considering another directly connected broker.

If, on the other hand, the attributes of the received message do match the routing information for the directly connected broker that is currently being considered in the loop (stage 450, Yes), then process 400 forwards the message to that directly connected broker (stage 460).

In some embodiments, the attributes of the received message may be implemented in the form of metadata that accompanies a message, so that the metadata is used by each broker to decide where to route the message. For example, in an AMQP-based implementation, the metadata may be in the form of a routing key or keys attached to the content of a message, which is compared to routing information in the form of binding keys to determine a match that causes the message to be moved to particular output queues. In other implementations, the metadata may be in the form of information, data, or values in a header, or a field of a header, that is attached to the content of message. In yet other embodiments, the attributes of the received message may be implemented in the form of metadata that is in the content or body of the message. For example, a specific word or words may be placed in the contents of a message, and the broker may parse or analyze the message content to determine whether a word matching the routing information is present. For another example, an XML specification or XML document in the message content may contain information that is used by brokers to route the message according to routing information that is dynamically maintained by each broker.

Next, as noted above, stage 470 determines whether all the directly connected brokers have been processed. If not, process 400 continues by looping back to stage 430. And if so, process 400 ends.

One of ordinary skill will recognize that stages may be added to, deleted from, or modified within process 400 without departing from the principles of the invention. For example, additional processing stages may be added to compare attributes of the message to the routing information, (which is based on the message-matching criteria), for a consumer(s) that is directly connected to the broker, and if there is a match, then to provide the message to the matching consumer(s).

Figure 5:
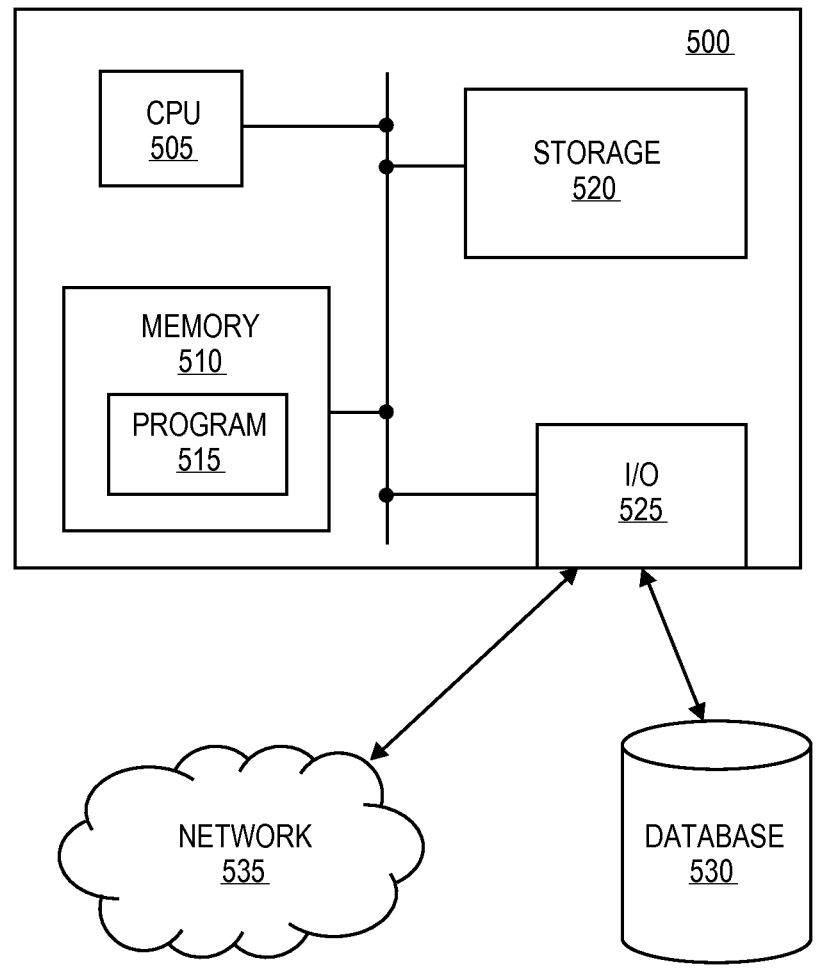
FIG. 5 is a block diagram of an exemplary computing system that may be used to implement embodiments consistent with the invention.

FIG. 5 is a block diagram of an exemplary computing system or data processing system 500 that may be used to implement embodiments consistent with the invention, such as for example, embodiments of messaging brokers, consumers and/or producers. The exact components and arrangement, however, are not critical to the invention. Computing system 500 includes a number of components, such as a central processing unit (CPU) 505, a memory 510, an input/output (I/O) device(s) 525, and a nonvolatile storage device 520. System 500 can be implemented in various ways. For example, an implementation as an integrated platform (such as a workstation, personal computer, laptop, etc.) may comprise CPU 505, memory 510, nonvolatile storage 520, and I/O devices 525. In such a configuration, components 505, 510, 520, and 525 may connect and communicate through a local data bus and may access a database 580 (implemented, for example, as a separate database system) via an external I/O connection. I/O component(s) 525 may connect to external devices through a direct communication link (e.g., a hardwired or local wifi connection), through a network, such as a local area network (LAN) or a wide area network (WAN) and/or through other suitable connections. System 500 may be standalone or it may be a subsystem of a larger system.

CPU 505 may be one or more known processors or processing devices, such as a microprocessor from the Core™ 2 family manufactured by Intel™ Corporation (San Jose, Calif.) or the Athlon™ family manufactured by AMD™ Corporation (Sunnyvale, Calif.). Memory 510 may be one or more fast storage devices configured to store instructions and information used by CPU 505 to perform certain functions and processes related to embodiments of the present invention. Storage 520 may be a volatile or non-volatile, magnetic, semiconductor, tape, optical, or other type of storage device or computer-readable medium, including devices meant for long-term storage.

In the illustrated embodiment, memory 510 contains one or more programs or subprograms 515 loaded from storage 520 that, when executed by CPU 505, perform various procedures, processes, or methods consistent with the present invention. Alternatively, CPU 505 may execute one or more programs located remotely from system 500. For example, system 500 may access one or more remote programs via a network 535 that, when executed, perform functions and processes related to or implementing embodiments of the present invention.

In one embodiment, memory 510 may include a computer program 515 that implements process 400. Memory 510 may also include other programs or applications that implement other methods and processes that provide ancillary functionality for a broker, consumer, or producer.

Methods and systems consistent with the invention are not limited to programs or computers configured to perform dedicated tasks. For example, memory 510 may be configured with a program 515 that performs several functions when executed by CPU 505. For example, memory 510 may include a single program 515 that implements both process 400 and the functionality of a message producer or the functionality of a network manager.

Memory 510 may be also be configured with other programs (not shown) unrelated to the invention and/or an operating system (not shown) that performs several functions well known in the art when executed by CPU 505. By way of example, the operating system may be Microsoft Windows™, UniX™, Linux™, an Apple Computers™ operating system, Personal Digital Assistant operating system such as Microsoft CE™, or other operating system. The choice of operating system, and even to the use of an operating system, is not critical to the invention.

I/O device(s) 525 may comprise one or more input/output devices that allow data to be received and/or transmitted by system 500. For example, I/O device 525 may include one or more input devices, such as a keyboard, touch screen, mouse, and the like, that enable data to be input from a user, such as a system operator. Further, I/O device 525 may include one or more output devices, such as a display screen, CRT monitor, LCD monitor, plasma display, printer, speaker devices, and the like, that enable data to be output or presented to a user. I/O device 525 may also include one or more digital and/or analog communication input/output devices that allow computing system 500 to communicate, preferably digitally, with other machines, computing systems and devices, such as network communication ports, etc. The configuration and number of input and/or output devices incorporated in I/O device 525 are not critical to the invention.

In the embodiment shown, system 500 is connected to a network 535 (e.g., the Internet or a private network), which may in turn be connected to various systems and computing machines (not shown), such as computers that are brokers, consumers, or producers. In general, system 500 may input data (including messages) from external machines and devices and output data (including messages) to external machines and devices via network 535.

In the exemplary embodiment shown in FIG. 5, database 530 is a standalone database external to system 500. In other embodiments, database 530 may be hosted by system 500. In various embodiments, database 530 may manage and store data used to implement systems and methods consistent with the invention. For example, database 530 may manage and store data structures that contain subscription information, message-matching criteria, routing information, link information, network connection information, and the like.

Database 530 may comprise one or more databases that store information and are accessed and/or managed through system 500. By way of example, database 530 may be an Oracle™ database, a Sybase™ database, or other relational database. Systems and methods consistent with the invention, however, are not limited to separate data structures or databases, or even to the use of a database or data structure.

The foregoing description is illustrative, and variations in configuration, implementation, and embodiment of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method comprising:
   storing, by a central processing unit, routing information for each of a plurality of message consumers connected to a messaging network, the routing information comprising an identification number (IN) that is associated with a first message consumer of the plurality of message consumers, the messaging network comprising a plurality of brokers;
   receiving a message and metadata associated with the message from a message producer without identification or an address of an intended message consumer, wherein the metadata comprises a routing key attached to the message;
   comparing, by the central processing unit, the routing key to the routing information for each of the plurality message consumers connected to the messaging network via the plurality of brokers;
   determining, by the central processing unit and in view of the comparing, that a broker of the plurality of brokers in the messaging network is connected to the first message consumer of the plurality of message consumers when the routing key corresponds to the IN, wherein the central processing unit is in data communication with the broker via the messaging network; and
   routing, by the central processing unit, the message to the broker that is connected to the first message consumer that is associated with the IN.

2. The method of claim 1, further comprising:
   determining, by the central processing unit and in view of the comparing, whether there is a second message consumer of the plurality of message consumers that is directly connected to a computing system that comprises the central processing unit that can receive the message; and
   routing, by the central processing unit, the message to the second message consumer that was determined when the message consumer can receive the message.

3. The method of claim 1, wherein the metadata associated with the message comprises a topic assigned to the message by a producer of the message.

4. The method of claim 1, wherein the message comprises content, and wherein the routing information comprises information that must match corresponding information in the content of the message, and wherein the information that must match is specified by the message consumer.

5. The method of claim 1, wherein storing routing information for each message consumer comprises:
   updating the routing information for a message consumer of the plurality of message consumers that changes a connection status with the messaging network.

6. A system comprising:

a memory to contain instructions; and a central processing unit, operatively coupled to the memory, to execute the instructions to:

- maintain routing information for each of a plurality of message consumers connected to a messaging network, the routing information comprising an identification number (IN) that is associated with a first message consumer of the plurality of message consumers, the messaging network comprising a plurality of brokers;
- receive a message and metadata associated with the message from a message producer without identification or an address of an intended message consumer, wherein the metadata comprises a routing key attached to the message;
- compare the routing key to the routing information for each of the plurality of message consumers connected to the messaging network via the plurality of brokers;
- determine, in view of the comparing, that a broker of the plurality of brokers is connected to the first message consumer of the plurality of message consumers when the routing key corresponds to the IN, wherein the central processing unit is in data communication with the broker via the messaging network; and
- route the message to the broker that is connected to the first message consumer that is associated with the IN.

7. The system of claim 6, the central processing unit further to:

- determine, in view of the comparing, whether there is a second message consumer of the plurality of message consumers that is directly connected to a computing system that can receive the message; and
- route the message to the message consumer that was determined when the second message consumer can receive the message.

8. The system of claim 6, wherein the metadata associated with the message comprises a topic assigned to the message by a producer of the message.

9. The system of claim 6, wherein the message comprises content, and wherein the routing information comprises information that must match corresponding information in the content of the message, and wherein the information that must match is specified by the message consumer.

10. The system of claim 6, wherein when maintaining routing information for each message consumer, the central processing unit to:

- update the routing information for a message consumer of the plurality of message consumers that changes a connection status with the messaging network.

11. A non-transitory computer-readable medium comprising instructions that, when executed by a central processing unit, cause the central processing unit to:

- store routing information for each of a plurality of message consumers connected to a messaging network, the routing information comprising an identification number (IN) that is associated with a first message consumer of the plurality of message consumers, the messaging network comprising a plurality of brokers;
- receive a message and metadata associated with the message from a message producer without identification or an address of an intended message consumer, wherein the metadata comprises a routing key attached to the message;
- compare, by the central processing unit, the routing key to the routing information for each message consumer of the plurality of message consumers connected to the messaging network via the plurality of brokers;
- determine, by the central processing unit in view of the comparing, that a broker of the plurality of brokers is connected to the first message consumer of the plurality of message consumers when the routing key corresponds to the IN, wherein the central processing unit is in data communication with the broker via the messaging network; and
- route the message to the broker that is connected to the first message consumer that is associated with the IN.

12. The non-transitory computer-readable medium of claim 11, the central processing unit further to:

- determine, in view of the comparing, whether there is a second message consumer of the plurality of message consumers that is directly connected to a computing system that can receive the message, wherein the computing system comprises that central processing unit; and
- route the message to the second message consumer that was determined when the consumer can receive the message.

13. The non-transitory computer-readable medium of claim 11, wherein the message comprises content, and wherein the routing information comprises information that must match corresponding information in the content of the message, and wherein the information that must match is specified by the message consumer.

14. The non-transitory computer-readable medium of claim 11, wherein when storing routing information for each message consumer, the central processing unit is to:

- update the routing information for a message consumer when the message consumer changes a connection status with the messaging network.

* * * * *